US009650924B2

United States Patent
Bandyopadhyay et al.

(10) Patent No.: US 9,650,924 B2
(45) Date of Patent: May 16, 2017

(54) ENGINE CONTROL SYSTEM HAVING QUICK-OPEN VALVE TIMING

(71) Applicant: Electro-Motive Diesel, Inc., La Grange, IL (US)

(72) Inventors: Deep Bandyopadhyay, Naperville, IL (US); Vijaya Kumar, Darien, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 366 days.

(21) Appl. No.: 14/201,611

(22) Filed: Mar. 7, 2014

(65) Prior Publication Data

US 2015/0252695 A1 Sep. 10, 2015

(51) Int. Cl.

| *F01L 13/08* | (2006.01) |
|---|---|
| *F01L 1/08* | (2006.01) |
| *F02B 25/04* | (2006.01) |
| *F02D 19/10* | (2006.01) |
| *F02D 13/02* | (2006.01) |

(52) U.S. Cl.
CPC ............... *F01L 13/08* (2013.01); *F01L 1/08* (2013.01); *F02B 25/04* (2013.01); *F02D 13/0249* (2013.01); *F02D 19/10* (2013.01); *F02D 13/0215* (2013.01); *Y02T 10/18* (2013.01); *Y02T 10/36* (2013.01)

(58) Field of Classification Search
CPC ............ F02D 13/0203; F02D 13/0207; F02D 13/0211; F02D 13/0215; F02D 13/0242; F02D 13/0246; F02D 13/0249; F02D 13/0284; F01L 13/08

USPC ....................................................... 123/90.15
See application file for complete search history.

(56) References Cited

U.S. PATENT DOCUMENTS

| 4,577,598 A * | 3/1986 | Ma ........................ | F01L 1/356 |
| | | | 123/90.15 |
| 4,616,606 A * | 10/1986 | Ma ........................ | F01L 1/352 |
| | | | 123/90.17 |
| 5,158,044 A * | 10/1992 | Kawamura .............. | F01L 1/08 |
| | | | 123/21 |
| 5,450,824 A * | 9/1995 | Yamane ................ | F02D 13/023 |
| | | | 123/90.15 |

(Continued)

FOREIGN PATENT DOCUMENTS

| JP | S 58-152140 | 9/1983 |
| WO | WO 2005/056995 | 6/2005 |
| WO | WO 2008/008583 | 1/2008 |

*Primary Examiner* — Hung Q Nguyen
*Assistant Examiner* — Kevin R Steckbauer
(74) *Attorney, Agent, or Firm* — Finnegan, Henderson, Farabow, Garrett & Dunner, LLP (57) ABSTRACT

A control system for an engine includes a variable valve timing device configured to selectively adjust opening and closing of an exhaust valve of the engine, a sensor configured to generate a signal indicative of a condition associated with pre-ignition of air and fuel in a cylinder of the engine, and a controller in communication with the variable valve timing device and the sensor. The controller is configured to control the variable valve timing device to selectively initiate a conventional valve timing or a quick-open valve timing based on the signal. In the quick-open valve timing the exhaust valve is moved from a closed position to a maximum lift position in a shorter amount of time than in the conventional valve timing.

13 Claims, 4 Drawing Sheets

(56) References Cited

U.S. PATENT DOCUMENTS

| | | | | |
|---|---|---|---|---|
| 5,606,942 A * | 3/1997 | Tsuzuku | ............... | F01L 1/053 123/90.16 |
| 5,743,225 A * | 4/1998 | Sakurai | ............... | F01L 1/26 123/315 |
| 6,651,624 B2 * | 11/2003 | Gaessler | ............... | F02D 13/0246 123/345 |
| 6,810,844 B2 * | 11/2004 | Sellnau | ............... | F01L 1/08 123/90.16 |
| 7,055,480 B2 * | 6/2006 | Kusaka | ............... | F01L 1/08 123/90.11 |
| 7,216,613 B2 | 5/2007 | Shikata et al. | | |
| 7,267,088 B2 * | 9/2007 | Ezaki | ............... | F01L 1/042 123/90.11 |
| 7,334,550 B2 * | 2/2008 | Jesel | ............... | F01L 1/08 123/90.44 |
| 7,367,295 B2 * | 5/2008 | Zauner | ............... | F01L 1/026 123/65 P |
| 7,568,457 B2 * | 8/2009 | Kusaka | ............... | F01L 1/34413 123/90.11 |
| 7,568,458 B2 * | 8/2009 | Roth | ............... | F01L 1/3442 123/90.15 |
| 7,881,854 B2 * | 2/2011 | Lanteires | ............... | F01L 9/04 123/478 |
| 8,065,878 B2 * | 11/2011 | Vuk | ............... | F02D 13/0249 123/315 |
| 8,365,528 B2 * | 2/2013 | Leone | ............... | F02D 13/0219 123/90.15 |
| 8,550,042 B2 * | 10/2013 | Taylor | ............... | F02B 25/04 123/65 VC |
| 9,279,348 B2 * | 3/2016 | Lauer | ............... | F01L 1/08 |
| 9,347,384 B2 * | 5/2016 | Takada | ............... | F01N 3/2066 |
| 2004/0107927 A1 * | 6/2004 | Sellnau | ............... | F01L 1/08 123/90.16 |
| 2004/0118367 A1 * | 6/2004 | Ezaki | ............... | F01L 1/042 123/90.11 |
| 2007/0017461 A1 * | 1/2007 | Jesel | ............... | F01L 1/08 123/90.6 |
| 2007/0062470 A1 * | 3/2007 | Ashizawa | ............... | F02B 23/101 123/90.15 |
| 2007/0186882 A1 * | 8/2007 | Zauner | ............... | F01L 1/026 123/65 PE |
| 2008/0017151 A1 * | 1/2008 | Kusaka | ............... | F01L 1/34413 123/90.31 |
| 2009/0050085 A1 * | 2/2009 | Lanteires | ............... | F01L 9/04 123/90.15 |
| 2009/0223220 A1 * | 9/2009 | Vuk | ............... | F02D 13/0249 60/602 |
| 2009/0248271 A1 * | 10/2009 | Kuzuyama | ............... | F02B 39/10 701/103 |
| 2010/0170460 A1 * | 7/2010 | Leone | ............... | F02D 13/0249 123/90.16 |
| 2012/0174881 A1 * | 7/2012 | Taylor | ............... | F02B 25/04 123/68 |
| 2014/0000559 A1 * | 1/2014 | Gutscher | ............... | F02M 21/0278 123/445 |
| 2014/0014075 A1 * | 1/2014 | Yager | ............... | F02D 41/0047 123/568.11 |
| 2014/0096730 A1 * | 4/2014 | Lauer | ............... | F01L 1/08 123/90.15 |
| 2014/0261288 A1 * | 9/2014 | Coney | ............... | F02G 3/00 123/197.1 |
| 2015/0101319 A1 * | 4/2015 | Takada | ............... | F01N 3/2066 60/301 |
| 2015/0260115 A1 * | 9/2015 | Masuda | ............... | F02D 19/0692 123/432 |
| 2015/0361914 A1 * | 12/2015 | Oka | ............... | F02D 13/0242 123/90.15 |

* cited by examiner

ENGINE CONTROL SYSTEM HAVING QUICK-OPEN VALVE TIMING

TECHNICAL FIELD

The present disclosure is directed to an engine control system, more particularly, to an engine control system having quick-open valve timing.

BACKGROUND

Engines, such as diesel engines and dual-fuel engines, include ports and valves to regulate the entrance and exit of air, fuel, and exhaust into and out of the engine cylinders. The cylinders of some uniflow scavenged two-stroke dual-fuel engines include intake ports that are opened by movement of a piston and allow for introduction of air and gaseous fuel, as well as one or more exhaust valves for removing post-combustion exhaust from the cylinder. The exhaust valve cyclically opens and closes to control the flow of exhaust out of each cylinder. The opening/closing profile of an exhaust valve, relative to crankshaft angle, is commonly known as valve timing. Valve timing, including the degree to which a valve is open (e.g., amount of lift), relative to crankshaft angle, may be depicted as a lift profile.

Conventional exhaust valve timing and lift profiles have been known to cause blow-by in some dual-fuel engines. Blow-by is the reverse flow of exhaust from the cylinder through the intake ports to an air-box, just as the intake ports are opened. As air flows from a compressor outlet through the air-box and past each cylinder, it is heated by the hot exhaust that escapes from the cylinders during blow-by. In some instances, this may create a temperature difference along the air-box of about 5-20° F. In some engines, this temperature difference can cause pre-ignition of gaseous fuel in the cylinder(s) furthest from the compressor due to the higher temperature. During pre-ignition, gaseous fuel burns before liquid fuel is injected into the combustion chamber. Thus, pre-ignition can cause the engine to operate inefficiently.

Some engines include variable valve timing devices configured to adjust the timing of an exhaust valve of a diesel engine according to different parameters. For example, Japanese Patent Document JPS 58152140 published on Sep. 9, 1983 ("the '140 document") discloses a variable valve timing device that controls the opening of an exhaust valve depending on operating conditions of the engine. Specifically, the variable valve timing device includes an actuator that is activated to change the time at which the exhaust valve opens.

While the variable valve timing device of the '140 document may allow for adjustment of the time when an exhaust valve opens to alter peak cylinder pressure after combustion, it may not be applicable to inhibiting pre-ignition of gaseous-fuel caused by blow-by. In particular, since the variable valve timing device of the '140 document does not allow for control of a cylinder pressure specifically at a time that an intake valve is opened, it may remain susceptible to creation of a pressure differential that allows for blow-by. In other words, even though peak cylinder pressure may be adjusted by the device of the '140 document, cylinder pressure at a time when blow-by occurs (e.g., when intake ports are opened) is not controlled. The '140 document does not include a control system and/or exhaust system that would allow for such control.

The disclosed fuel system is directed to overcoming one or more of the problems set forth above and/or other problems of the prior art.

SUMMARY

In one aspect, the present disclosure is directed to a method of operating an engine. The engine may include a cylinder, a piston slidably disposed in the cylinder, and an exhaust valve configured to open and close an exhaust port. The method may include directing air and fuel into the cylinder, and combusting the air and fuel to force the piston between a TDC position and a BDC position. The method may also include cyclically opening and closing the exhaust valve during piston movement according to a first valve timing. The method may further include receiving a signal indicative of a condition associated with pre-ignition of the air and fuel, and selectively opening and closing the exhaust valve according to a second valve timing, based at least on the signal. In addition, in the second valve timing, the exhaust valve may be moved from a closed position to a maximum lift position in a shorter amount of time than in the first valve timing.

In another aspect, the present disclosure is directed to a control system for a dual-fuel engine. The dual-fuel engine may include a cylinder, a piston slidably disposed in the cylinder, and exhaust valve. The control system may include a variable valve timing device configured to selectively adjust opening and closing of the exhaust valve. The control system may also include a sensor configured to generate a signal indicative of a condition associated with pre-ignition of air and fuel in the cylinder, and a controller in communication with the variable valve timing device and the sensor. The controller may be configured to control the variable valve timing device to selectively initiate a conventional valve timing or a quick-open valve timing based on the signal. In the quick-open valve timing, the exhaust valve may be moved from a closed position to a maximum lift position in a shorter amount of time than in the conventional valve timing.

In yet another aspect, the present disclosure is directed to a dual-fuel engine. The dual-fuel engine may include a cylinder at least partially defining a combustion chamber and including an intake port and an exhaust port fluidly connected to the combustion chamber. The dual-fuel engine may also include a gaseous fuel injector configured to radially inject gaseous fuel into the combustion chamber through the intake port, and a diesel fuel injector configured to axially inject diesel fuel into the combustion chamber. The dual-fuel engine may further include a piston slidably disposed in the cylinder and configured to compress fuel and air to cause combustion that produces exhaust and move between a TDC position and a BDC position. The dual-fuel engine may additionally include an exhaust valve configured to move from a closed position when the piston is approximately 9-13° before TDC, reach a maximum lift position when the piston is approximately 63-65° past TDC, and lower back to the closed position when the piston is approximately 167-1710 past TDC.

DETAILED DESCRIPTION

Figure 1:
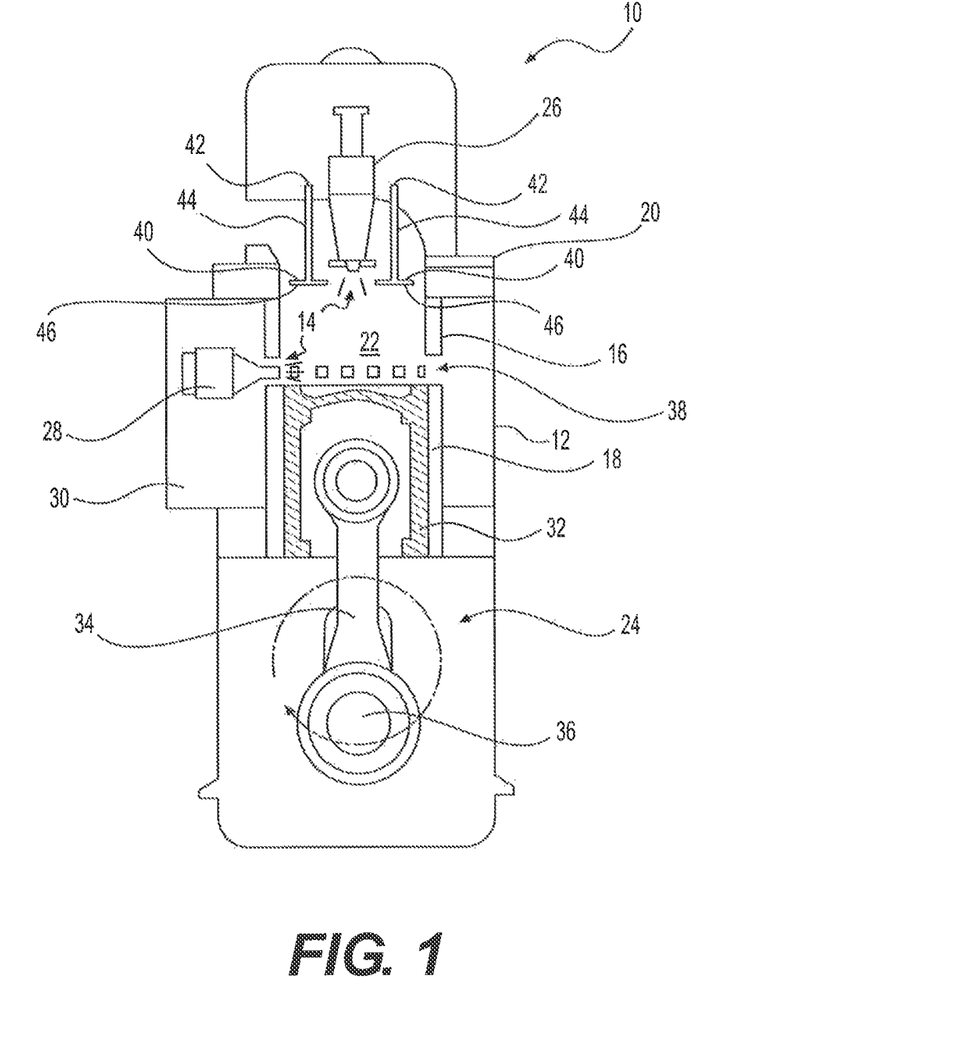
FIG. 1 is a cross-sectional illustration of an exemplary dual-fuel engine.

FIG. 1 illustrates an exemplary internal combustion engine 10. Engine 10 is depicted and described as a two-stroke dual-fuel engine. It should be understood, however, that engine 10 may be any other type of internal combustion engine, including a diesel engine or a gaseous-fuel engine. Engine 10 may include an engine block 12 that at least partially defines a plurality of cylinders 16 (only one shown), each having an associated cylinder head 20. A cylinder liner 18 may be disposed within each engine cylinder 16, and cylinder head 20 may close off an end of liner 18. A piston 24 may be slidably disposed within each cylinder liner 18.

Each cylinder liner 18, cylinder head 20, and piston 24 may together define a combustion chamber 22 that receives fuel from a fuel system 14 mounted to engine 10. Engine 10 may include any number of engine cylinders 16 with corresponding combustion chambers 22. In an exemplary embodiment, engine 10 may be a sixteen-cylinder engine, including two banks of eight cylinders 16. Fuel system 14 may include a liquid fuel injector 26 (e.g., diesel fuel injector) and one or more gaseous fuel injectors 28 (e.g., natural gas injectors) for each cylinder 16. Liquid fuel injector 26 may be positioned at least partially inside each cylinder head 20 and configured to axially inject liquid fuel into a top of each combustion chamber 22. One or more gaseous fuel injectors 28 may be positioned inside an air-box 30 adjacent each cylinder liner 18 and configured to radially inject gaseous fuel into each combustion chamber 22.

Within engine cylinder liner 18, piston 24 may be configured to reciprocate between a bottom-dead-center (BDC) or lower-most position, and a top-dead-center (TDC) or upper-most position. In particular, piston 24 may be an assembly that includes a piston crown 32 pivotally connected to a rod 34, which may in turn be pivotally connected to a crankshaft 36. Crankshaft 36 of engine 10 may be rotatably disposed within engine block 12 and each piston 24 coupled to crankshaft 36 by rod 34 so that a sliding motion of each piston 24 within cylinder liner 18 results in a rotation of crankshaft 36. Similarly, a rotation of crankshaft 36 may result in a sliding motion of piston 24. As crankshaft 36 rotates through about 180 degrees, piston crown 32 and rod 34 may move through one full stroke between BDC and TDC. Engine 10, being a two-stroke engine, may have a complete cycle that includes a power/exhaust/intake stroke (TDC to BDC) and an intake/compression stroke (BDC to TDC).

During a final phase of the power/exhaust/intake stroke described above, air may be drawn from air-box 30 into combustion chamber 22 via one or more gas exchange ports (e.g., air intake ports) 38 located within a sidewall of cylinder liner 18. In particular, as piston 24 moves downward within liner 18, a position will eventually be reached at which air intake ports 38 are no longer blocked by piston 24 and instead are fluidly communicated with combustion chamber 22. When air intake ports 38 are in fluid communication with combustion chamber 22 and a pressure of air at air intake ports 38 is greater than a pressure within combustion chamber 22, air will pass through air intake ports 38 into combustion chamber 22. In a dual-fuel engine, such as engine 10, gaseous fuel injectors 28 may inject gaseous fuel (e.g., methane, natural gas, etc.) into combustion chamber 22 (e.g. radially injected) through at least one of air intake ports 38 while air intake ports 38 are open. The gaseous fuel may mix with the air to form a fuel/air mixture within combustion chamber 22.

Eventually, piston 24 will start an upward movement that blocks air intake ports 38 and compresses the air/fuel mixture. As the air/fuel mixture within combustion chamber 22 is compressed, a temperature of the mixture may increase. At a point when piston 24 is near TDC, a liquid fuel (e.g. diesel or other petroleum-based liquid fuel) may be injected into combustion chamber 22 via liquid fuel injector 26. The liquid fuel may be ignited by compression ignition, generating a flame that propagates through the gaseous fuel, causing combustion of both types of fuel and resulting in a release of chemical energy in the form of temperature and pressure spikes within combustion chamber 22. During a first phase of the power/exhaust/intake stroke, the pressure spike within combustion chamber 22 may force piston 24 downward, thereby imparting mechanical power to crankshaft 36. At a particular point during this downward travel between TDC and BDC, one or more gas exchange ports (e.g., exhaust ports) 40 located within cylinder head 20 may open to allow pressurized exhaust within combustion chamber 22 to exit and the cycle will restart.

One or more exhaust valves 42 may be arranged to open and close exhaust ports 40 during each engine cycle. Each exhaust valve 42 may include a valve element 44 disposed within an exhaust port 40 in cylinder head 20 and configured to selectively engage a seat 46. Specifically, valve element 44 may be movable between a first position, at which valve element 44 engages seat 46 to prevent a flow of fluid relative to exhaust port 40 (e.g., a closed position), and a second position, at which valve element 44 is removed from seat 46 to allow a flow of fluid (e.g., exhaust) relative to exhaust port 40 (e.g., a maximum lift position). Each exhaust valve 42 may cyclically move between the first position and the second position (including from the second position back to the first position) according to a valve timing.

Figure 2:
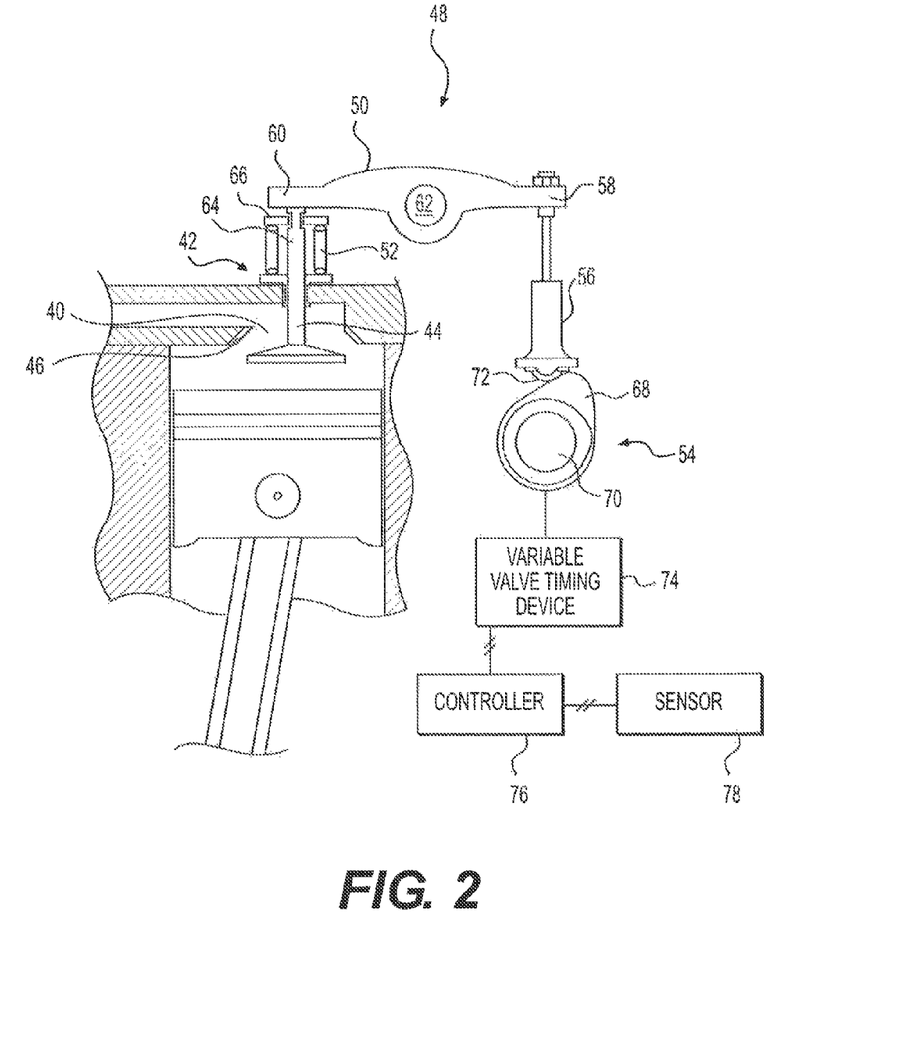
FIG. 2 is a cross-sectional illustration of an exemplary valve actuation assembly that may be used in conjunction with the engine of FIG. 1.

FIG. 2 depicts an exemplary valve actuation assembly 48 operatively associated with engine 10 to move valve element 44 through its valve timing. It should be noted that each cylinder head 20 of engine 10 may include one or more associated exhaust ports 40 and exhaust valves 42. For example, each cylinder head 20 of a sixteen-cylinder dual-fuel engine may include two exhaust valves, for a total of thirty-two. Engine 10 may include a valve actuation assembly 48 for each cylinder head 20 that is configured to actuate all of the exhaust valves 42 of that cylinder head 20. It is also contemplated that a single valve actuation assembly 48 could actuate the exhaust valves 42 associated with multiple cylinder heads 20, if desired. It should also be understood that valve actuation assembly 48 is exemplary, and that other valve actuation assemblies may be possible.

Each valve actuation assembly 48 may include a rocker arm 50, a valve spring 52, a cam arrangement 54, and a cam follower 56. Cam arrangement 54 may rotate to translate cam follower 56 in cyclical fashion, the translation of cam follower 56 inducing a pivoting of rocker arm 50 and subsequent movement of valve element 44 between the first and second positions.

Rocker arm 50 may mechanically move valve element 44 between the first and second positions. Specifically, rocker arm 50 may include a first end 58, a second end 60, and a pivot point 62. First end 58 of rocker arm 50 may be operatively engaged with cam follower 56, while second end 60 may be operatively engaged with valve element 44 through a valve stem 64. A rotation of rocker arm 50 about pivot point 62 may cause valve element 44 to move from the first position to the second position. Valve spring 52 may act on valve stem 64 through a locking nut 66. In particular, valve spring 52 may bias valve element 44 into the first position, where valve element 44 engages seat 46 to prevent a flow of fluid relative to exhaust port 40.

Cam arrangement 54 may be operatively engaged with crankshaft 36 of engine 10 in any manner readily apparent to one skilled in the art where a rotation of crankshaft 36 will result in a corresponding rotation of cam arrangement 54. For example, cam arrangement 54 may be connected to crankshaft 36 through a gear train (not shown) that reduces the rotational speed of cam arrangement 54 to an appropriate speed relative to the camshaft. As illustrated in FIG. 2, cam arrangement 54 may include a cam lobe 68 fixedly connected to a cam shaft 70. The shape and rotational speed of cam lobe 68 may determine, at least in part, the valve timing and lift of valve element 44 during normal operation of engine 10.

Cam follower 56 may be adapted to follow the profile of cam lobe 68, as cam lobe 68 rotates with cam shaft 70, and to transfer a corresponding reciprocating motion to rocker arm 50. In particular, cam follower 56 may extend from cam arrangement 54 to first end 58 of rocker arm 50, and include at least one tappet or roller-type protrusion 72. Protrusion 72 may engage and follow the profile of cam lobe 68. As cam arrangement 54 rotates, the profile of cam lobe 68 may cause protrusion 72 and connected cam follower 56 to rise and lower, thereby producing the pivoting motion of rocker arm 50 about pivot point 62. Thus, the rotation of cam arrangement 54 may cause valve element 44 to move from the first position to the second position (and back to the first position) to create a lift profile corresponding to a profile of cam lobe 68. In an exemplary embodiment, cam arrangement 54 may be configured to cause valve element 44 to move according to a lift profile associated with a quick-open valve timing.

In an exemplary embodiment, the valve actuation assembly 48 of engine 10 may be arranged such that each cylinder 16 is configured with the same exhaust valve timing. It should be understood however, that the exhaust valve timing may vary across cylinders 16. For example, one or more cylinders 16 may include exhaust valves 42 operated according to a first exhaust valve timing, while one or more other cylinders 16 may include exhaust valves 42 operated according to a second exhaust valve timing.

In some embodiments, valve actuation assembly 48 may be operably connected to a variable valve timing device 74 for further control over the actuation of exhaust valve 42. In particular, variable valve timing device 74 may be configured to dynamically adjust a timing of exhaust valve 42 by way of valve actuation assembly 48. Variable valve timing device 74 may be a component of a control system configured to control at least valve actuation assembly 48 and, thus, exhaust valve timing of engine 10.

Variable valve timing device 74 may be any device configured to selectively change the valve timing of exhaust valve 42. For example, variable valve timing device 74 may include a cam phaser, an actuator, a cam switch, or any other variable valve timing device known in the art. In an exemplary embodiment, variable valve timing device 74 may be a device configured to adjust the rotational speed of cam arrangement 54. Variable valve timing device 74 may be operably connected to any component of valve actuation assembly 48, depending on the arrangement of the particular variable valve timing device 74. For example, a cam phaser may be operably connected between crankshaft 36 and cam arrangement 54.

It should be understood that variable valve timing device 74 may be configured control a valve timing associated with any or all of the cylinders 16 of engine 10. For example, variable valve timing device 74 may be configured to uniformly change the valve timing associated with each cylinder 16, change the valve timing of only some of the cylinders 16, individually change the valve timing of each cylinder 16 or groups of cylinders 16, and the like. In this way, variable valve timing device 74 may be configured to independently or collectively control the specific valve timing of each cylinder 16, including varying the valve timing across all cylinders 16.

Variable valve timing device 74 may be electronically connected to a controller 76. Controller 76 may be a computing device configured to electronically control variable valve timing device 74. In particular, controller 76 may be configured to manage variable valve timing device 74 to selectively control a valve timing of exhaust valve 42. In an exemplary embodiment, controller 76 may be configured to control a valve timing of exhaust valve 42 by controlling a rotational speed of cam arrangement 54 through electronic communication with variable valve timing device 74.

In some embodiments, controller 76 may be electronically connected to a sensor 78. Sensor 78 may be arranged to monitor a performance parameter of engine 10, and transmit the information to controller 76. For example, sensor 78 may monitor an air temperature, an engine load, an engine speed (e.g., a rotational speed of cam arrangement 54), and/or any another performance parameter relevant to the exhaust valve timing. Sensor 78 may be a temperature sensor, load sensor, speed sensor, or other sensor known in the art and configured to measure the performance parameter specific to the type of sensor 78.

Controller 76 may be configured to control variable valve timing device 74 based, at least in part, on information from sensor 78. In this way, controller 76 may be configured to selectively control a valve timing of exhaust valve 42 based at least on the performance parameter. For example, controller 76 may instruct variable valve timing device 74 to control valve actuator assembly 48 to actuate exhaust valve 42 according to a first valve timing under certain conditions (e.g., a particular range of engine speeds, engine load below a threshold, etc.) and to actuate exhaust valve 42 according to a second valve timing under other conditions (e.g., another range of engine speeds, engine load above a threshold, etc.).

Figure 3:
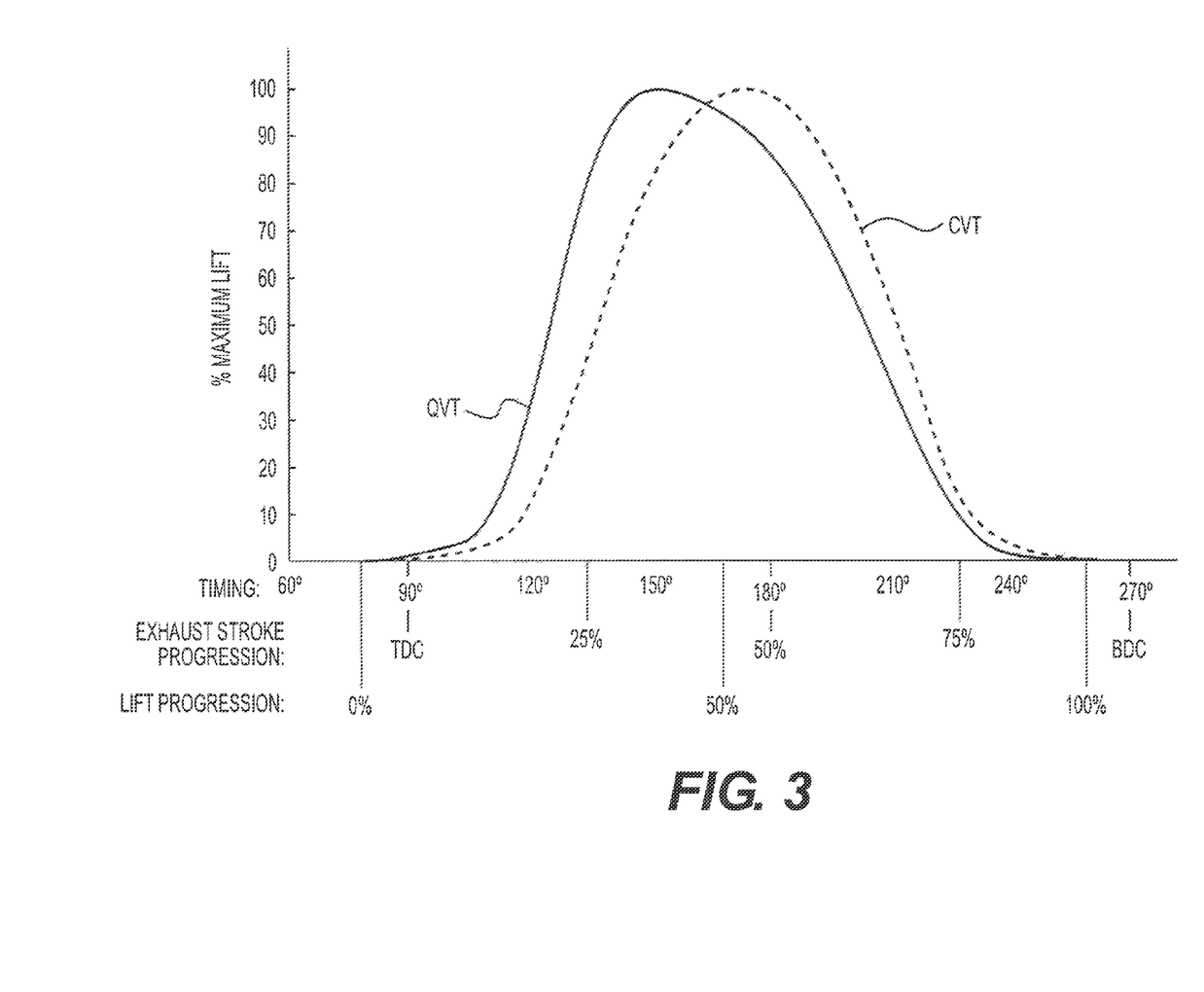
FIG. 3 is a graph illustrating an exemplary operation performed by the valve actuation assembly of FIG. 2.

In an exemplary embodiment, engine 10 is configured such that at least one exhaust valve may be operated according to a quick-open valve timing QVT. FIG. 3 illustrates a graph of valve lift vs. engine timing, exhaust stroke progression (e.g., percent completion of an exhaust stroke between TDC and BDC), and lift progression (e.g., percent completion of a time period during which an exhaust valve is open) for an exemplary disclosed QVT, in addition to a conventional valve timing CVT.

Figure 4:
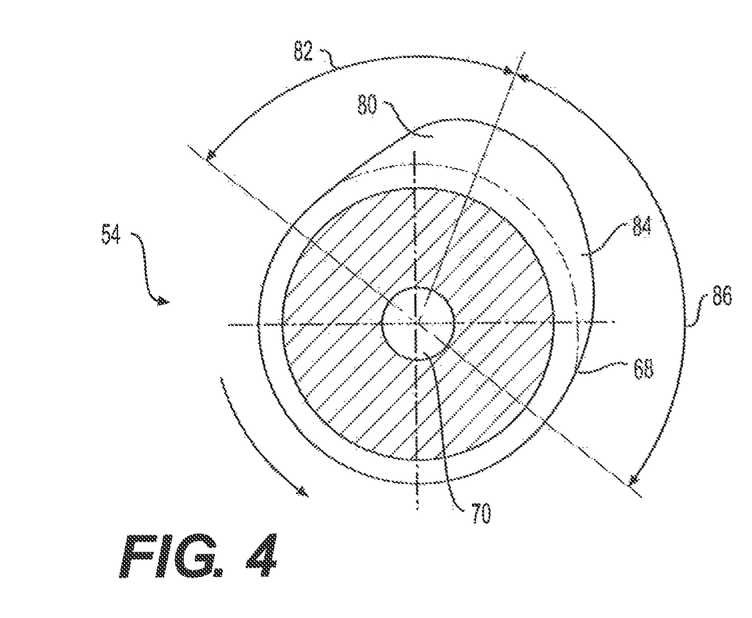
FIG. 4 is an illustration of an exemplary cam arrangement that may be used in conjunction with the valve actuation assembly of FIG. 2.
Figure 5:
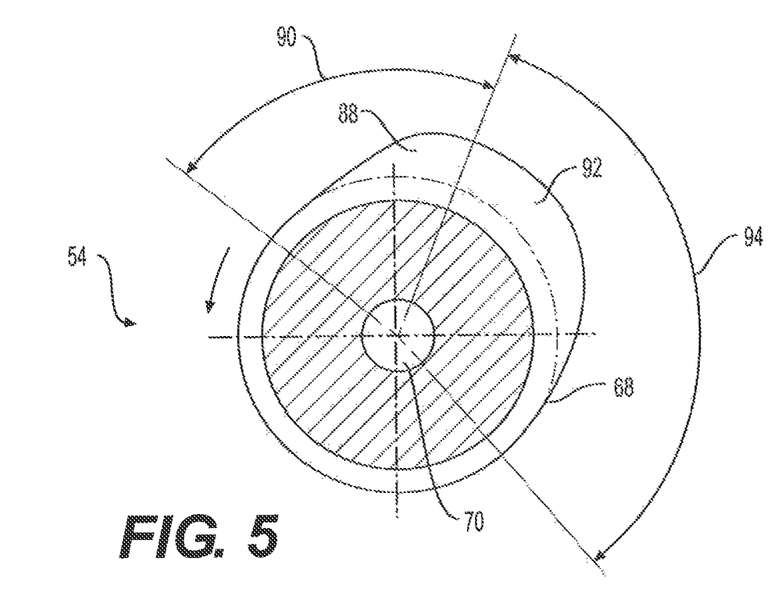
FIG. 5 is an illustration of another exemplary cam arrangement that may be used in conjunction with the valve actuation assembly of FIG. 2.

FIG. 4 illustrates an exemplary cam arrangement 54 that may be used to implement QVT. In particular, cam arrangement 54 may include a cam lobe 68 with a cam profile shaped to cause valve actuation assembly 48 to open and close exhaust valve 42 according to QVT. In an exemplary embodiment, cam lobe 68 of FIG. 4 may include a leading cam lobe 80 which may cause valve actuation assembly 48 to lift exhaust valve 42 from a closed position to a maximum lift position during a leading profile 82. Cam lobe 68 of FIG. 4 may also include a trailing cam lobe 84 which may cause valve actuation assembly 48 to lower exhaust valve from the maximum lift position back to the closed position during a trailing profile 86. FIG. 5 illustrates another exemplary cam arrangement 54 that may be used to implement an alternative valve timing, such as an extended quick-open valve timing. Cam arrangement 54 may include cam lobe 68 with a leading cam lobe 88 corresponding to a leading profile 90 and a trailing cam lobe 92 corresponding to a trailing profile 94.

FIG. 3 and the configurations of cam arrangements 54 of FIGS. 4 and 5 will be discussed in more detail below to illustrate the disclosed concepts.

INDUSTRIAL APPLICABILITY

The exemplary disclosed control system may be applicable to any engine that includes a cylinder having a gas-exchange valve. The disclosed quick-open valve timing may be particularly applicable to two-cycle engines (e.g., dual-fuel or gaseous-fuel engines) that include radially located intake ports and exhaust valves that are cyclically opened and closed. Operation of engine 10 will now be described.

During operation, gaseous fuel may be injected from gaseous fuel injector 28 during a time period when air intake ports 38 are open. During this time, air may flow from air-box 30 into combustion chamber 22. As piston 24 moves upwardly from BDC, piston crown 32 will gradually close air intake ports 38 until they are completely closed, trapping an air-fuel mixture in combustion chamber 22. After gaseous fuel is injected and intake ports 38 are closed, piston crown 32 may continue to compress the air-fuel mixture. At a point near TDC, liquid fuel (e.g., diesel fuel) may be injected into combustion chamber 22. As piston 24 finishes its compression stroke, the injected liquid fuel may cause combustion of the overall fuel mixture, imparting force to move piston 24 through an expansion/power/exhaust stroke and restarting the cycle.

During a given cycle, each exhaust valve 42 may be opened by valve actuation assembly 48 around the time of combustion to allow post-combustion exhaust to flow out of combustion chamber 22. Exhaust valve 42 may be closed by valve actuation assembly 48 around the time that intake ports 38 are opened by piston crown 32. The position of exhaust valve 42 may correspond to a lift profile, which may affect the flow of exhaust out of combustion chamber 22. That is, the degree to which valve member 44 is lifted from seat 46 may further define the manner in which engine 10 operates.

FIG. 3 depicts a graph of valve lift vs. engine timing associated with exemplary lift profiles. FIG. 3 depicts both a conventional exhaust valve timing CVT and an exemplary quick-open valve timing QVT according to a disclosed embodiment. It should be understood, however, that QVT depicted in FIG. 3 is one example of a quick-open exhaust valve timing. Quick-open valve timings that include variations from QVT are considered within the scope of the present disclosure. In an exemplary embodiment, QVT allows a two-cycle engine (e.g., dual-fuel or gaseous fuel engine) to operate more efficiently by inhibiting pre-ignition of gaseous fuel in one or more cylinders 16 of engine 10.

Pre-ignition of gaseous fuel may be caused by blow-by exhaust the flows backwards out of an intake port 38 instead of out through an exhaust port 40. The hot blow-by exhaust is blown toward a distal end of air-box 30, heating the air that enters the cylinders 16 from the distal end and causing a temperature gradient across the cylinders 16 of a cylinder bank. In some instances, the air that enters a cylinder 16 may be heated to a temperature that causes gaseous fuel to ignite prematurely (e.g., ignite prior to injection of the liquid fuel). This pre-ignition is undesirable, causing inefficient combustion and increased emissions, among other problems. A two-cycle dual-fuel engine 10 operating according to CVT may experience blow-by because the pressure in combustion chamber 22 is higher than the pressure of incoming air at the time intake ports 38 are opened. On the other hand, QVT of disclosed embodiments may allow the pressure inside combustion chamber 22 to rapidly decrease to a value below the pressure of incoming air at the time intake ports 38 are opened, inhibiting the reverse flow of exhaust out of combustion chamber 22 through an intake port 38.

As shown in FIG. 3, the lift profile for an exemplary QVT may include an opening time (e.g., the engine timing at which exhaust valve 42 begins to open) and a closing time (e.g., the engine timing at which exhaust valve 42 closes) that are the same as or similar to that of CVT. In particular, both QVT and CVT may include opening times of approximately 9-13° before TDC and closing times of approximately 167-171° past TDC. While exhaust valve 42 is open, valve member 44 may reach a maximum lift position, which, as used herein, may correspond to the position at which valve member 44 is at its highest point of the lift profile, and not necessarily the highest possible lift position that may be attained by exhaust valve 42

As shown in FIG. 3, valve member 44 may reach the maximum lift position at different times, depending on whether QVT or CVT is in use. In particular, QVT corresponds to a relatively quick opening period, as compared to CVT (e.g., in QVT the exhaust valve is moved from a closed position to a maximum lift position in a shorter amount of time than in CVT). In an exemplary embodiment, QVT may include a timing where valve member 44 reaches about 50% of its maximum lift position at a point when piston 24 is approximately 35-37° past TDC and reaches its maximum lift position at a point when piston 24 is approximately 63-65° past TDC. Described another way, during QVT, exhaust valve 42 may take approximately 41% of the total time period during which exhaust valve 42 is open to move from the closed position to its maximum lift position (e.g., lift progression from 0% to 41%, as shown in FIG. 3).

On the other hand, CVT may include a valve timing where valve member 44 reaches about 50% of its maximum lift position at a point when piston 24 is approximately 47-49° past TDC and reaches its maximum lift position at a point when piston 24 is approximately 84-86° past TDC. During CVT, exhaust valve 42 may take approximately 54% of the total time period during which exhaust valve 42 is open to move from the closed position to its maximum lift position (e.g., lift progression from 0% to 54%, as shown in FIG. 3).

In order to ensure that a sufficient amount of exhaust exits the combustion chamber (e.g., a sufficient amount of mass) during a given engine cycle, QVT may include a relative slow closing period, as compared to CVT. In particular, QVT may include a valve timing where valve member 44 is lowered to about 75% of its maximum lift position at a point when piston 24 is approximately 99-101° past TDC and lowered to about 25% of its maximum lift position at a point when piston 24 is approximately 126-128° past TDC. Described another way, during QVT, exhaust valve 42 takes approximately 59% of the total time period during which exhaust valve 42 is open to move from its maximum lift position to the closed position (e.g., lift progression from 41% to 100%, as shown in FIG. 3).

On the other hand, CVT may include exhaust valve 42 closing more quickly. In particular, having reached its maximum lift position at approximately 84-86° past TDC, valve member 44 may be lowered to about 75% of its maximum lift position at a point when piston 24 is approximately 111-113° past TDC and lowered to about 25% of its maximum lift position at a point when piston 24 is approximately 131-133° past TDC. During CVT, exhaust valve 42 may take approximately 46% of the total time period during which exhaust valve 42 is open to move from its maximum lift position to the closed position (e.g., lift progression from 54% to 100%, as shown in FIG. 3).

In some embodiments, QVT may be used as a dedicated valve timing for cylinder 16 during operation of engine 10, which may include use by all cylinders 16 or only some of cylinders 16 (e.g., some cylinders 16 operating with QVT and other cylinders 16 operating with CVT). In these embodiments, one or more components of cam arrangement 54 (e.g., cam lobe 68) may be shaped to cause valve actuation assembly 48 to open and close exhaust valve 42 according to QVT. For example, cam arrangement 54 of FIG. 4 may be used to implement QVT.

As shown in FIG. 4, leading cam lobe 80 may include a steep section configured to cause valve actuation assembly 48 to quickly lift exhaust valve 42 to the maximum lift position during a time period corresponding to leading profile 82. In an exemplary embodiment, leading profile 82 may correspond to about 74° of rotation of cam arrangement 54, from the closed position to the maximum lift position. Trailing cam lobe 84, on the other hand, may include a more gradual section configured to cause valve actuation assembly 48 to lower exhaust valve 42 to the closed position relatively more slowly. Accordingly, trailing profile 86 may correspond to about 108.5° degrees of rotation of cam arrangement 54, from the maximum lift position to the closed position.

In some embodiments, an alternative quick-open valve timing may be implemented as a dedicated valve timing. For example, an extended quick-open valve timing may be implemented using cam arrangement 54 depicted in FIG. 5. This cam arrangement 54 may include a cam lobe 68 that is similar to cam lobe 68 depicted in FIG. 4, however, trailing cam lobe 92 may be shaped to cause valve actuation assembly 48 to delay closing of exhaust valve 42. For example, trailing cam lobe 92 may cause valve actuation assembly 48 to dwell exhaust valve 42 at the maximum lift position for about 10°. In this way trailing profile 94 may correspond to about 118.5° of rotation of cam arrangement 54, from the maximum lift position, through the period of dwelling, and eventually to the closed position. The extended quick-open valve timing of the cam arrangement 54 of FIG. 5 may allow for additional advantages, such as a reduction in compression pressure of a corresponding cylinder, which may further inhibit pre-ignition of gaseous fuel.

In other embodiments, variable valve timing device 74 may control valve actuation assembly 48 to selectively operate exhaust valve 42 according to one or more valve timings, including QVT and CVT. In this way, engine 10 may be configured to switch between at least a first and second valve timing, depending on a particular condition of engine 10.

In an exemplary embodiment, variable valve timing device 74 may control valve actuation assembly 48 to operate exhaust valve 42 according to a first exhaust valve timing after engine 10 starts. As engine 10 operates, sensor 78 may generate a signal indicative of a performance parameter, such as engine load, air temperature, cylinder pressure, and/or engine speed, and transmit the signal to controller 76. Based at least on the signal, controller 76 may selectively control valve actuation assembly 48 to change a valve timing of exhaust valve 42 from the first exhaust valve timing to the second exhaust valve timing.

In some embodiments, controller 76 may be configured to selectively implement QVT based on a signal from sensor 78 indicative of a condition associated with pre-ignition, such as pre-ignition of gaseous fuel. For example, controller 76 may receive temperature measurements from sensor 78 and implement QVT when the temperature reaches a threshold value. In an exemplary embodiment, the threshold value may be a temperature at and/or above which a risk of pre-ignition of gaseous fuel exists. Controller 76 may similarly selectively control valve timing based on additional or alternative conditions indicative of pre-ignition, such as engine load and/or speed above a threshold value, a detection of fuel slippage, detection of particular exhaust constituents, etc. In this way, controller 76 may selectively switch timings to inhibit pre-ignition within one or more of cylinders 16.

In at least one embodiment, variable valve timing device 74 may dynamically control rotational speed of cam arrangement 54 to vary the valve timing of exhaust valve 42 according to an engine load measured by sensor 78. For example, engine 10 may operate according to QVT until variable valve timing device 74 selectively implements another valve timing through control of the rotational speed of cam arrangement 54.

Controller 76 may also selectively implement the extended quick-open valve timing. As described above with respect to FIG. 5, during the extended quick-open valve timing, valve actuation assembly 48 may be configured to lift exhaust valve 42 to the maximum lift position in the same amount of time as QVT, and then dwell exhaust valve 42 at about the maximum lift position to delay the closing of exhaust valve 42 and thus extend the period of time exhaust valve 42 is lifted compared to QVT. In this way, subsequent compression pressure within an associated cylinder 16 may be reduced. A reduction in compression pressure may lead to reduced temperature within the cylinder 16 and thus also contribute to inhibiting pre-ignition of gaseous fuel. It should be understood however, that any other valve timings may be selected and used under particular conditions, depending on the requirements of engine 10.

The exemplary disclosed embodiments may be used to implement a quick-open valve timing in an engine that benefits from use of such a timing. For example, a dual-fuel engine may implement QVT to inhibit blow-by exhaust from escaping a combustion chamber through an intake port just as the intake port is opened. This may be achieved with quick-open valve timing through rapid opening of the exhaust valve such that the pressure in the combustion chamber drops quickly and the pressure in combustion chamber is less than that of the air-box at the time the intake valves are opened. The pressure differential at this time may help to ensure that fluid will flow into instead of out of the combustion chamber through the intake ports, thereby inhibiting blow-by. In this way, abnormal heating of the air in air-box may be prevented, reducing the risk of pre-ignition in one or more of the cylinders and resulting in more efficient operation of the engine. Further, in embodiments that implement a variable valve timing device, use of QVT may be optimized for use under only certain conditions, allowing one or more other valve timings to be used, such as under conditions when quick-open valve timing is not necessary or a quick-open valve timing with a different lift profile is more appropriate.

It will be apparent to those skilled in the art that various modifications and variations can be made to the disclosed engine control system. Other embodiments will be apparent to those skilled in the art from consideration of the specification and practice of the disclosed engine control system. It is intended that the specification and examples be considered as exemplary only, with a true scope being indicated by the following claims and their equivalents.

What is claimed is:

1. A method for operating a two-stroke engine having a cylinder, a piston disposed in sliding engagement with the cylinder, and an exhaust valve configured to open and close an exhaust port, the method comprising:
   directing air and a fuel into the cylinder;
   burning a mixture of the air and the fuel to force the piston between a top dead center (TDC) position and a bottom dead center (BDC) position;
   cyclically opening and closing the exhaust valve according to a first valve timing during movement of the piston relative to the cylinder;
   receiving a signal that is indicative of a condition associated with pre-ignition of the mixture of the air and the fuel, the condition associated with pre-ignition of the mixture of the air and the fuel includes at least one of an inlet air temperature above a predetermined temperature threshold and an engine load above a predetermined load threshold; and
   selectively opening and closing the exhaust valve according to a second valve timing, based at least on the signal,
   wherein a crank angle duration to move the exhaust valve from a closed position to a maximum lift position according to the second valve timing is less than a crank angle duration to move the exhaust valve from the closed position to the maximum lift position according to the first valve timing, and
   wherein a total crank angle duration of the exhaust valve being open according to the second valve timing is equal to a total crank angle duration of the exhaust valve being open according to the first valve timing.

2. The method of claim 1, wherein opening the exhaust valve in the second valve timing includes opening the exhaust valve to 50% of the maximum lift position when the piston is 35-37° past TDC.

3. The method of claim 2, wherein opening the exhaust valve in the second valve timing further includes opening the exhaust valve to the maximum lift position when the piston is 63-65° past TDC.

4. The method of claim 3, wherein closing the exhaust valve in the second valve timing includes lowering the exhaust valve to 75% of the maximum lift position when the piston is 99-101° past TDC.

5. The method of claim 4, wherein closing the exhaust valve in the second valve timing further includes lowering the exhaust valve to 25% of the maximum lift position when the piston is 126-128° past TDC.

6. The method of claim 1, wherein opening the exhaust valve in the second valve timing includes moving the exhaust valve from the closed position to the maximum lift position in 41% of the total crank angle duration of the exhaust valve being open according to the second valve timing.

7. The method of claim 1, wherein directing the air and the fuel into the cylinder includes radially injecting gaseous fuel into the cylinder through an intake port.

8. The method of claim 1, further comprising changing a rotational speed of a cam arrangement to selectively open and close the exhaust valve according to the second valve timing.

9. The method of claim 3, wherein opening the exhaust valve in the first valve timing includes opening the exhaust valve to the maximum lift position at 84-86° past TDC.

10. The method of claim 9, wherein opening the exhaust valve in the first valve timing further includes moving the exhaust valve from the closed position to the maximum lift position in 54% of the total crank angle duration of the exhaust valve being open according to the first valve timing.

11. The method of claim 1, further comprising selectively delaying closing of the exhaust valve in the second valve timing.

12. A control system for a two-stroke engine including a cylinder, a piston disposed in sliding engagement with in the cylinder, and an exhaust valve, the control system comprising:
   a variable valve timing device configured to selectively adjust opening and closing of the exhaust valve;
   a sensor configured to generate a signal that is indicative of a condition associated with pre-ignition of a mixture of air and a fuel in the cylinder; and
   a controller in communication with the variable valve timing device and the sensor, the controller being configured to control the variable valve timing device to selectively initiate a conventional valve timing or a quick-open valve timing based on the signal,
   wherein a crank angle duration to move the exhaust valve from a closed position to a maximum lift position according to the quick-open valve timing is less than a crank angle duration to move the exhaust valve from the closed position to the maximum lift position according to the conventional valve timing,
   wherein a total crank angle duration of the exhaust valve being open according to the quick-open valve timing is equal to a total crank angle duration of the exhaust valve being open according to the conventional valve timing,
   wherein the sensor includes at least one of a temperature sensor and a load sensor, and
   wherein the condition associated with pre-ignition of the mixture of the air and the fuel includes at least one of an inlet air temperature above a predetermined temperature threshold and an engine load above a predetermined load threshold.

13. The control system of claim 12, wherein according to the quick-open valve timing the exhaust valve is moved from the closed position to the maximum lift position in 41% of the total crank angle duration of the exhaust valve being open according to the quick-open valve timing.

* * * * *